(No Model.)

J. C. JONES.
FERMENTING TANK WINE STRAINER.

No. 441,419. Patented Nov. 25, 1890.

Witnesses,
Geo. H. Strong
J. H. Rouse

Inventor,
John C. Jones
By Dewey & Co.
att'ys

THE NORRIS PETERS CO., PHOTO-LITHO., WASHINGTON, D. C.

United States Patent Office.

JOHN C. JONES, OF NAPA, CALIFORNIA.

FERMENTING-TANK WINE-STRAINER.

SPECIFICATION forming part of Letters Patent No. 441,419, dated November 25, 1890.

Application filed December 11, 1889. Serial No. 333,329. (No model.)

*To all whom it may concern:*

Be it known that I, JOHN C. JONES, a citizen of the United States, residing at Napa, Napa county, State of California, have invented an Improvement in Fermenting-Tank Wine-Strainers; and I hereby declare the following to be a full, clear, and exact description of the same.

My invention relates to a device to be used in connection with the discharge of wine from the tanks in which it is fermented.

It consists of a removable strainer and a means for cleansing the same while in position.

Figure 1:
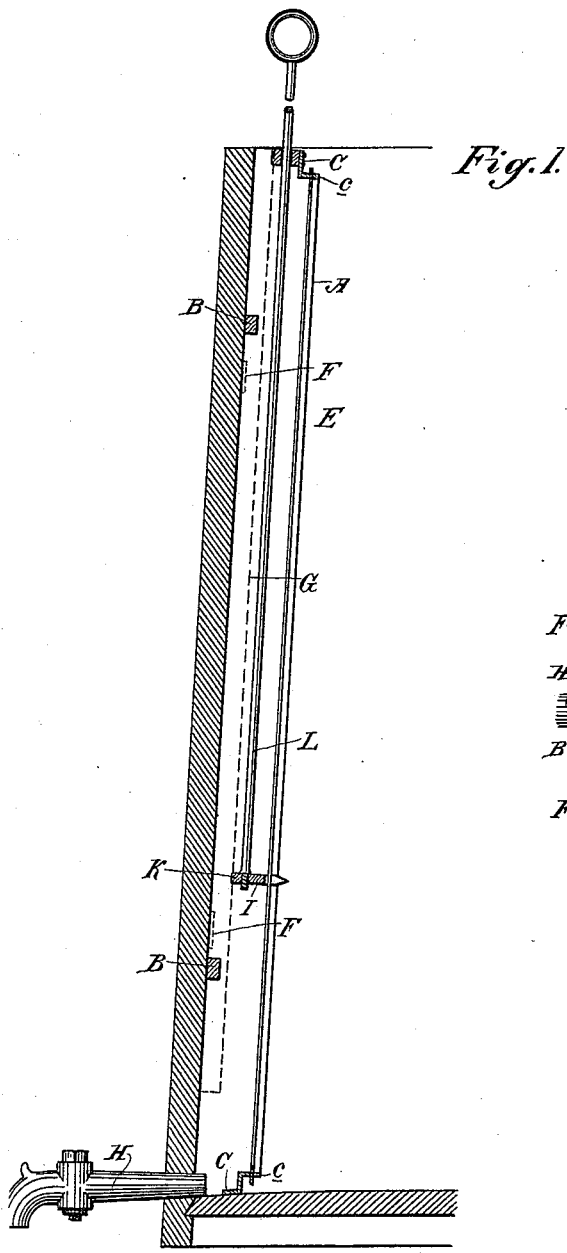
Figure 2:
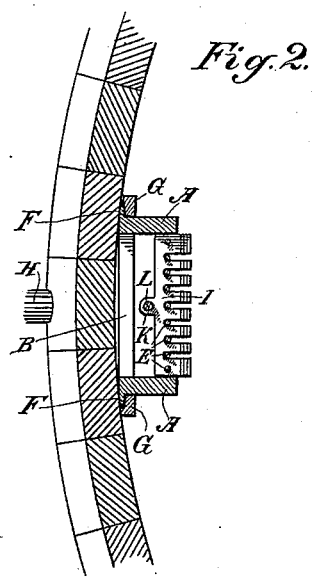

Referring to the accompanying drawings for a more complete explanation of my invention, Figure 1 is a vertical section of a fermenting-tank, showing the discharge-cock and my strainer in position. Fig. 2 is a horizontal section.

After the juice has been expressed from the grapes the juice and pomace are placed in tanks to undergo the process of fermentation, and after this has been completed the wine is drawn off for further treatment. By reason of the mass of pomace contained in the tank and scattered through the body of the wine it is extremely difficult to draw the latter off rapidly or to form a strainer which will not become continually clogged by the pomace within the tank. My invention is designed to overcome this difficulty.

A A are the sides of the strainer, and consist of boards or strips of a length equal to about the depth of the tank. These sides are suitably connected together by transverse strips B at the edges, which rest against the inner side of the tank, and by plates C, which are secured to the outer ends, as shown. In the present case these plates are shown with upturned flanges c, having holes through them, and the wires E are passed through these holes, so as to stand parallel with each other and extend longitudinally from top to bottom of the device. These wires may be fixed in the plates C in various ways, either by heading or riveting at both ends after a sufficient tension has been given them, or by heading one end and screw-threading the other, so that the screw-threaded ends may screw into corresponding threaded holes formed in the flange of the corresponding plate, which enables me to keep a proper tension upon the wires composing the screen.

Upon the edges of the side pieces A, which lie in contact with the inner side of the tank, are fixed the projecting strips or flanges F, and guides G are fixed within the tank having a slot or space left between them and the side of the tank, into which the flanges F enter, and by which they are guided in their vertical movements. By this construction I am enabled to introduce the screen or strainer and slip it to the bottom of the tank, against the sides of which it is held with sufficient steadiness by the guides above described.

At the bottom of the tank, between the guides, is a hole having a faucet H, through which the wine may be drawn off, and it will be manifest that the wine will enter the space between the sides A through the screen or straining-wires, which will serve to prevent the pomace from entering this space. By reason of the depth of the strainer the wine passes through it, so as to stand at about the same height within as it is without the strainer, and thus there will be no appreciable pressure upon the wires which form the strainer, nor any tendency to a strong suction, which would act to draw the pomace against the strainer and clog it.

In order to cleanse this strainer from the pomace whenever it may be partially clogged, I employ the beveled or wedge-shaped bar I, which extends across the full width of the strainer, the wedge-shaped portion projecting outwardly between the wires and being slotted so as to admit the wires of the strainer to pass through the slots in the bar. The outer ends of the bar, however, instead of being slotted, have holes bored through them of sufficient size, so that the outer wires pass through these holes and serve as guides, upon which the bar may be raised and depressed, sliding up and down upon the wires, and by reason of the slots which inclose the central wires any pomace or clogging material which may be lodged against the wires will be forced off, the beveled or wedge shape of the bar facilitating this action. The rear portion of the bar I has a central projection K, into which the lower end of the rod L is fixed. The rod L extends up through the upper plate C, and has a handle by which it may be raised and depressed, so as to slide the cleaning-bar up and down upon the wires, and the latter may be thus freed from any clogging material by one or two movements, so as to leave them free for the passage of the wine. It will be manifest that one of these devices may be used to draw off a great number of tanks, as it can be removed from one tank as soon as that has been completed and placed in another. By reason of the depth of the strainer the wine can be drawn off very rapidly and a great deal of time saved in the operation. As the strainer is removable, it will not be necessary to leave it in the tank during the hours of fermentation.

Having thus described my invention, what I claim as new, and desire to secure by Letters Patent, is—

1. The combination, with a fermenting-tank having a discharge-cock at the bottom, of vertical channeled guides fixed within the tank at each side of the discharge-opening and extending to the top of the tank, a vertical box with closed sides and lugs adapted to engage the guides and slide therein, vertical screw-threaded adjustable rods forming a screen upon the interior side of the removable box, a transverse bar or plate traveling upon the outer rods as guides and having the tongues projecting between the intermediate screen rods, and a rod L, connected with the transverse plate, whereby the latter may be reciprocated upon the screen-rods, substantially as herein described.

2. The fermenting-tank with a discharge-cock at the bottom, a vertically-sliding box traveling in guides upon each side of the cock and extending to the top of the tank, vertical rods stretched vertically to form a screen on the inner side of the box, a transverse bar guided upon the outside rods and having the beveled or V-shaped tongues extending outwardly between the intermediate screen-rods, and a vertical connecting-rod whereby the bar and its projecting tongues may be reciprocated upon the screen-rods, substantially as herein described.

In witness whereof I have hereunto set my hand.

JOHN C. JONES.

Witnesses:
GEO. H. STRONG,
S. H. NOURSE.